United States Patent

[11] 3,546,376

[72] Inventors John D. Crecelius
Ridgecrest;
William A. Arriola; Howard I. Sumnicht;
Ephraim Regelson; George G. Silberberg,
China Lake, California
[21] Appl. No. 701,930
[22] Filed Jan. 31, 1968
[45] Patented Dec. 8, 1970
[73] Assignee the United States of America as
represented by the Secretary of the Navy

[54] ATTITUDE AND RANGE DETERMINING SYSTEM
10 Claims, 3 Drawing Figs.
[52] U.S. Cl..................................................... 178/6.8
[51] Int. Cl..................................................... H04n 5/30

[50] Field of Search............................................. 178/6.8,
6(IND), 6(Trackers); 343/(Inquired), 5(MM),
6(TV)

[56] References Cited
UNITED STATES PATENTS
3,120,578  2/1964  Potter et al. ................... 178/6.8

Primary Examiner—Robert L. Griffin
Assistant Examiner—Richard K. Eckert, Jr.
Attorney—George J. Rubens, Roy Miller and Victor Muller ABSTRACT: A method of determining the orientation of an object in flight wherein the television image of a scale model of the object of interest and a television image of the filmed record of the same object are superimposed by rotating the model until the orientation of the scale model matches that of the filmed record.

PATENTED DEC -8 1970          3,546,376

INVENTORS.
JOHN D. CRECELIUS
WILLIAM A. ARRIOLA
HOWARD I. SUMNICHT
EPHRAIM REGELSON
GEORGE G. SILBERBERG
BY

ROY MILLER
ATTORNEY.

ATTITUDE AND RANGE DETERMINING SYSTEM

BACKGROUND OF THE INVENTION

In assessing the filmed flight of a moving target it is desirable to determine the instantaneous slant range, azimuth and elevation angles of the filmed target relative to the position of the camera at the time of the filming.

In filming the flight of a moving target the tracking film is not able to record the image of the target in a standard aspect. When evaluating the tracking film frame by frame, projective geometry must be used to rectify the image so that a known main dimension, such as a wing span or fusilage length, is at a right angle to the viewer. Comparison of the rectified image dimension with the actual dimension yields the target slant range. Such a technique will work, however the process is laborious and slow.

It is conceptually feasible to computerize projective geometry techniques. Such a system would have to be highly sophisticated and complex due to the fact that the rectification of the picture must be done on a point-to-point basis. A human eye, which can discriminate one tenth of a degree change between line movements, makes the idea of optical attitude recognition attractive.

SUMMARY OF THE INVENTION

In accordance with the present invention, the filmed image of a moving target is projected on a translucent screen. A first television camera records the image of the screen and feeds the data to a television monitor. A second television camera views a small scale model of the target. The small scale model is capable of being rotated about two axes, the first corresponding to azimuth and the second corresponding to elevation. The television camera viewing the model is capable of movement toward or away from the model. The position of the model, with respect to the television camera, is arranged to be read out directly in range, azimuth and elevation. At the position corresponding to superimposition the range, azimuth and elevation of the model correspond directly to the range, azimuth and elevation of a moving target with respect to a given camera.

DESCRIPTION OF THE PREFERRED EMBODIMENTS

Figure 1:
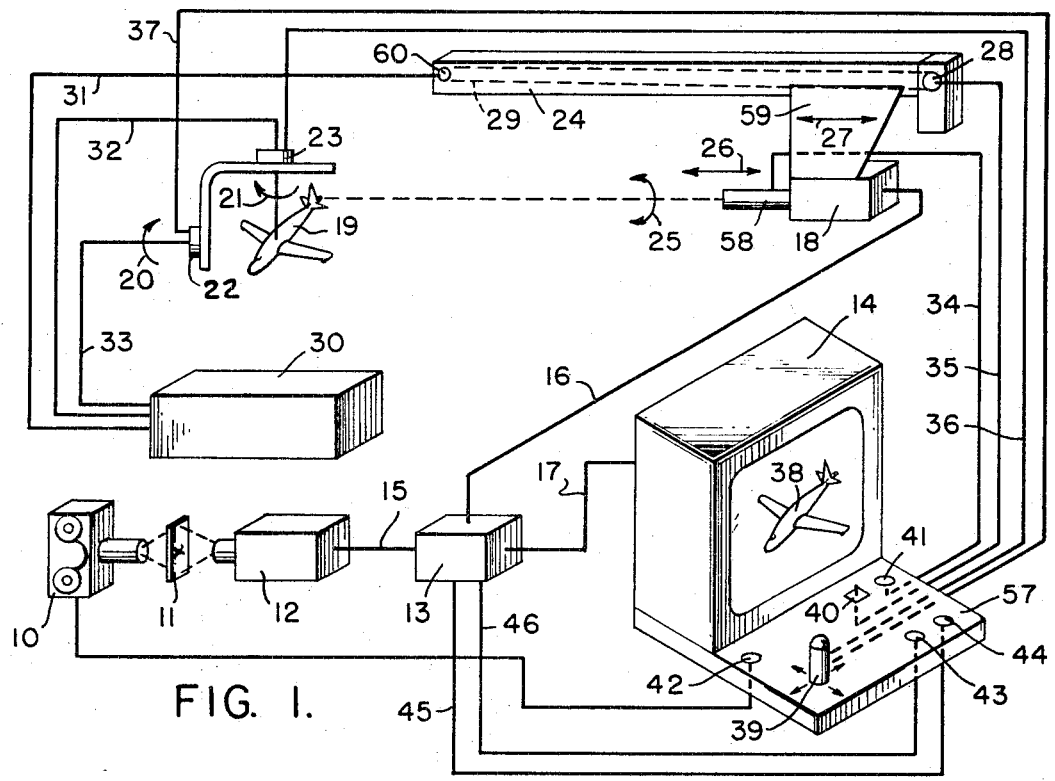
FIG. 1 is a perspective view partially in block diagram form of a preferred embodiment of the invention.

Referring to FIG. 1, a movie projector 10 projects an image of a moving target on to screen 11. Target television camera 12 views the image and transmits it electronically over data link 15 to mixer 13. The speed and direction at which the film moves through projector 10 and the intensity of the light source located within projector 10 may be controlled from control panel 57 by controlling means 42. During each data determination sequence the film passing through projector 10 is held stationary on a preselected frame which is of interest.

Figure 3:
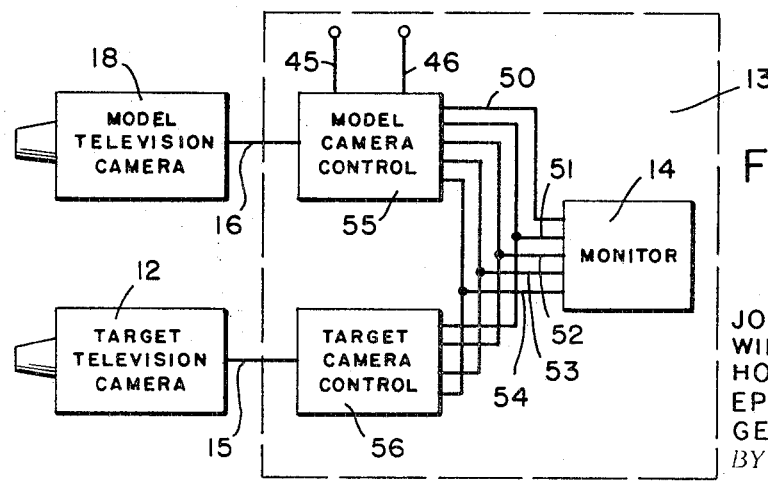
FIG. 3 is a block diagram of the mixer shown in FIG. 1.

Model television camera 18 views a scale model 19 through zoom lens 58 and also transmits the picture received to mixer 13 over data link 16. As shown in FIG. 3, model television camera 18 is operatively connected to model camera control 55 by data link 16 and target television camera 12 is operatively connected to target camera control 56 by data link 15. Monitor 14 is synchronized in time with model camera control 55 by synchronization link 50. Video output 51, horizontal drive 52, vertical drive 53 and blanking interval 54 which are used to drive monitor 14 are common to model camera control 55 and target camera control 56.

Data links 45 and 46 which are controlled by means 43 and 44 on control panel 57 operate to move the image of model 18 in vertical and horizontal directions, respectively, with respect to the position of the image received by target television camera 12.

Airplane model 19 is mounted so that its axes of rotation are centered about its tail section. Rotation of model 19 in direction 20 corresponds to a change in elevation which may be read out by elevation digital encoder 22. Rotation of model 19 in direction 21 corresponds to a change in azimuth which may be read out by azimuth digital encoder 23. It should be noted that encoders 22 and 23 may be replaced by potentiometers or any other suitable angular position measuring means.

Television camera 18 is mounted on a rail 24 by means of a support bracket 59 and is moved toward or away from scale model 19 in direction 27 by means of a cog belt 29 driven by a motor 28. Motor 28 is activated by range control 40 via data link 35. Camera 18, with zoom lens 58 mounted thereon, is rotatable in direction 25 about its optical axis. Lens 58 "zooms" in direction 26 and is controlled via data link 34 by controlling means 41.

Either of two alternate methods may be used to determine range. Both of these methods rely upon superimposition of the target image and the model image to form superimposed image 38 on the screen of monitor 14.

In the first method of determining range, television camera 18 is moved along direction 27 to a preselected point along rail 24. A specially wound, nonlinear helipot attached to the zoom gearing of lens 58 is wound to read out range as the lens is zoomed in direction 26 to create superimposed image 38 appearing on monitor 14. A second method of determining range fixes zoom 26 of lens 58 and moves camera 18 in direction 27 to create superimposition of images 38. In this second method, range is read out from a linear potentiometer or digital encoder 60 located at one end of rail 24. Lens 58 is equipped with an autofocus so that the image of model 19 is always in focus as it appears on monitor 14. Due to optical mismatch which may occur when the flight film is taken with a lens of fixed focal length, the second method of reading out range is preferred over the first.

Figure 2:
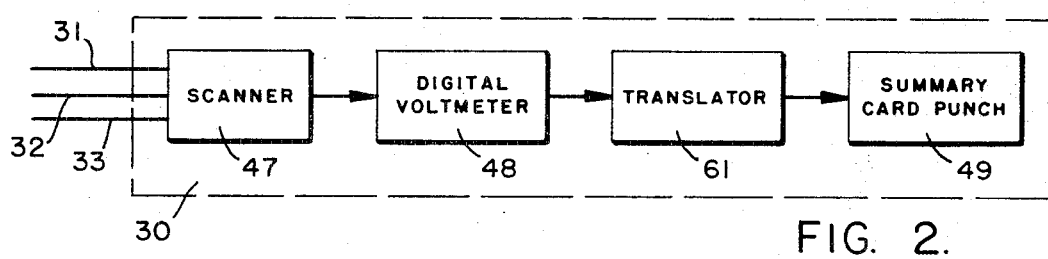
FIG. 2 is a block diagram of the means for reading out range, azimuth and elevation.

Read out means 30 may be more readily understood by reference to FIG. 2. Range, elevation and azimuth data are received by readout means 30 on data links 31, 32, and 33, respectively. Scanner 47 performs a switching function whereby range data 31, elevation data 32 and azimuth data 33 are alternately scanned, and when potentiometers are used to record range, azimuth and elevation, the information is converted into digital form by digital voltmeter 48. Translator 61 takes the information derived from digital voltmeter 48 and converts it into a form useable by summary card punch 49. Summary card punch 49 produces range, elevation and azimuth data for any desired position of model 19 on one punch card.

If encoders are used to provide range, elevation and azimuth data, digital voltmeter 48 is not used, and scanner 47 is connected directly to translator 61, as the encoders provide digital information which translator 61 can convert into a form useable by summary card punch 49.

The invention described herein may be manufactured and used by or for the Government of the United States of America for governmental purposes without the payment of any royalties thereon or therefore.

We claim:

1. A system for determining the orientation of an object in flight comprising:
   means for making a permanent visual record of a particular object in flight;
   means for converting the permanent visual record of the particular object into signals which are capable of being received by a television monitor;
   a scale model of the particular object;
   means for manipulating said scale model of the particular object in azimuth and elevation;
   means for recording the position of said scale model in azimuth and elevation;

means for making a visual record of said scale model, including means for converting said visual record of said scale model into signals which are capable of being received by a television monitor; and means for determining the range, azimuth and elevation of said particular object in flight with respect to the means for making said permanent visual record of the particular object in flight, including means for superimposing the visual record of said scale model upon the visual record of the particular object in flight on the same television monitor.

2. The system of claim 1 wherein:

the means for making a permanent visual record of said object in flight comprises a movie camera; and the means for converting said permanent visual record into signals capable of being received by a television monitor comprises:

a transluscent screen upon which the permanent visual record recorded by the movie camera is projected by a movie projector;

means for selecting a particular frame of the film in the movie camera for projection; and a television camera for viewing the transluscent screen to convert the permanent visual record into signals capable of being received by a television monitor.

3. The system of claim 2 wherein the means for making a visual record of said scale model comprises a television camera for viewing said model and producing signals capable of being received by a television monitor.

4. The system of claim 3 wherein:

means are provided for moving the television camera making a visual record of the scale model closer to or away form the scale model;

means are provided for recording the distance from the scale model to the focal plane of the television camera;

said television camera is equipped with a "zoom" lens having multiple focal lengths;

means are provided for calibrating the focal length of the lens as a function of the equivalent distance from the scale model to the focal plane of the television camera; and means are provided for recording the equivalent distance from the scale model to the focal plane of the television camera as a function of focal length of the "zoom" lens.

5. The system of claim 4 wherein the means for determining the range, azimuth and elevation of said particular object in flight with respect to the means for making the permanent visual record of the object comprises:

means for combining the signals emanating from the television camera viewing the permanent visual record and the signals emanating from the television camera viewing the model to cause the respective images of the permanent visual record and the model to appear on the same monitor screen;

means for moving the image of the model about the television raster;

means for superimposing the image of the model upon the image of the permanent visual record comprising:

means for manipulating the model in azimuth and elevation;

means for moving the image of the model about the television raster;

means for moving the television camera viewing the model closer to or away from the model with the "zoom" lens on the television camera fixed at a predetermined focal length; and means for rotating the television camera viewing the model about its optical axis;

means for converting the recorded position of the model so as to indicate the azimuth and elevation of the object in flight with respect to the means for making the permanent visual record of said object in flight; and means for converting the calibrated distance measurement of the television camera viewing the model to range of the object in flight with respect to the means for making the permanent visual record of said object in flight.

6. The system of claim 4 wherein:

the means for superimposing the image of the model upon the image of the permanent visual record comprises:

means for manipulating the model in azimuth and elevation;

means for moving the image of the model about the television raster;

means for changing the focal length of the "zoom" lens mounted on the television camera viewing the model with said television camera placed at a predetermined distance from the model; and means for rotating the television camera viewing the model about its optical axis; and the means for determining the range of the object in flight with respect to the means for making the permanent visual record of said object in flight comprises:

means for converting the calibrated known equivalent distance, as read out from the "zoom" lens, from the scale model to the focal plane of the television camera viewing the model to range of the object in flight with respect to the means for making the permanent visual record of said object in flight.

7. The system of claim 5 wherein:

the means for recording the position of said scale model comprises encoding means; and the means for determining the distance from the television camera viewing the model to the model comprises encoding means.

8. The system of claim 7 wherein:

the means of converting the recorded range elevation and azimuth data into the range, azimuth and elevation of the object in flight with respect to the means for making the permanent visual record of the object in flight comprises:

a scanner which serially reads the recorded range, azimuth and elevation data and feeds the serial information to translating means;

translating means which prepare the serial information for use by a summary card punch; and a summary card punch to make a permanent record of the range, azimuth and elevation of the object in flight with respect to the means for making the permanent visual record of said object in flight.

9. The system of claim 5 wherein:

the means for recording the position of said scale model comprises potentiometer means; and the means for determining the distance from the television camera viewing the model to the model comprises linear analogue potentiometer means.

10. The system of claim 9 wherein:

the means of converting the recorded range, elevation and azimuth data into the range, azimuth and elevation of the object in flight with respect to the means for making the permanent visual record of the object in flight comprises:

a scanner which serially reads the recorded analogue range, azimuth and elevation data and feeds the analogue serial information to a digital voltmeter;

a digital voltmeter to convert the analogue serial information to digital serial information for use by translating means;

translating means which prepare the serial information for use by a summary card punch; and a summary card punch to make a permanent record of the range, azimuth and elevation of the object in flight with respect to the means for making the permanent visual record of said object in flight.

75